(12) United States Patent
Quan et al.

(10) Patent No.: US 7,236,195 B2
(45) Date of Patent: Jun. 26, 2007

(54) METHOD AND SYSTEM FOR OPTIMIZING A SELECTION OF SPECTRAL SENSITIVITIES

(75) Inventors: Shuxue Quan, San Jose, CA (US); Naoya Katoh, Chiba (JP); Noboru Ohta, Rochester, NY (US); Mitchell Rosen, Rochester, NY (US)

(73) Assignees: Rochester Institute of Technology, Rochester, NY (US); Sony Corporation, Tokyo (JP)

( * ) Notice: Subject to any disclaimer, the term of this patent is extended or adjusted under 35 U.S.C. 154(b) by 0 days.

(21) Appl. No.: 10/289,495

(22) Filed: Nov. 6, 2002

(65) Prior Publication Data

US 2003/0138141 A1 Jul. 24, 2003

Related U.S. Application Data

(60) Provisional application No. 60/332,987, filed on Nov. 6, 2001.

(51) Int. Cl.
*H04N 3/14* (2006.01)
*H04N 5/225* (2006.01)
*H04N 5/228* (2006.01)
*G06K 9/00* (2006.01)
*G03F 3/08* (2006.01)

(52) U.S. Cl. ............... 348/273; 348/207.99; 348/222.1; 382/167; 358/518

(58) Field of Classification Search ............... 348/266, 348/272, 207.99, 223.1, 273, 277–280, 222; 250/252.1; 356/300, 416, 417; 382/162, 382/167, 168, 191; 358/448, 518
See application file for complete search history.

(56) References Cited

U.S. PATENT DOCUMENTS

| 5,631,979 | A | * | 5/1997 | Cok | 382/167 |
| 5,694,484 | A | * | 12/1997 | Cottrell et al. | 382/167 |
| 5,986,767 | A | * | 11/1999 | Nakano et al. | 356/419 |
| 6,023,525 | A | * | 2/2000 | Cass | 382/162 |
| 6,804,400 | B1 | * | 10/2004 | Sharp | 382/239 |
| 7,173,657 | B2 | * | 2/2007 | Katoh et al. | 348/273 |

OTHER PUBLICATIONS

Sharma et al. "Figures of Merit for Color Scanners", Jul. 1997, IEEE transactions on Image processing, vol. 6, No. 7, pp. 990-1001.*

Vora et al. "Measure of Goodness of a Set of Color-scanning Filters", Jul. 1993, Journal of the optical society of america, vol. 10, No. 7, pp. 1499-1508.*

(Continued)

*Primary Examiner*—Lin Ye
*Assistant Examiner*—Nhan T. Tran
(74) *Attorney, Agent, or Firm*—Nixon Peabody LLP (57) ABSTRACT

A method for optimizing a selection of spectral sensitivities for an imaging device includes determining a first set of spectral sensitivities from an initial set of spectral sensitivities based on an analysis of one of a universal measure of goodness, a μ-Factor, and RMS noise. A second set of spectral sensitivities is determined from the first plurality of sets of spectral sensitivities based on an analysis of a different one of the universal measure of goodness, the μ-Factor, and the RMS noise. The second set of spectral sensitivities is an optimized set of spectral sensitivities.

37 Claims, 7 Drawing Sheets

OTHER PUBLICATIONS

Vora et al. "Mathematical Methods for the Design of Color Scanning Filters", Feb. 1997, IEEE transactions on Image Processing, vol. 6, No. 2, pp. 312-320.*

Vora et al. "Mathematical Methods for the Analysis of Color Scanning Filters", Feb. 1997, IEEE Transaction on Image Processing, vol. 6, No. 2, pp. 321-327.*

Imai et al., "Digital camera filter design for colorimetric and spectral accuracy" Munsell Color Science Laboratory, Rochester Institute of Technology, Jun. 2001.*

Quan et al., "Optimal Camera Filter Design Based On Fabrication Process," *Nippon Shashin Gakkai Nenji Taikai Koen Yoshi* (2001).

* cited by examiner

METHOD AND SYSTEM FOR OPTIMIZING A SELECTION OF SPECTRAL SENSITIVITIES

The present invention claims the benefit of U.S. Provisional Patent Application Ser. No. 60/332,987, filed Nov. 6, 2001, which is hereby incorporated by reference in its entirety.

FIELD OF THE INVENTION

The invention relates generally to imaging and, more particularly, to a method and system for optimizing a selection of spectral sensitivities for an imaging device.

BACKGROUND OF THE INVENTION

The practice of capturing color images with digital imaging devices or systems, such as a digital camera or color scanner, is widely spreading. Currently, these digital devices include a charge-coupled device or complementary metal-oxide-semiconductor (CCD/CMOS) sensor array with a set of filters before it. Ideally, these digital imaging devices capture color images in a substantially accurate and aesthetically pleasing manner.

There are many criteria which are utilized in the design and production of color imaging devices. An important consideration is the ability of the device to deliver color signals which can be used to create high quality color reproductions. To quantify the color quality capability of such devices, it is important to determine how the device's response to color stimuli corresponds to that of a human. Through psychophysical experiments, the Commission Internationale de l'Eclairage (CIE) has generated a standard set of color matching functions for the standard observer, representing the average human visual response to color. As the human eye has three types of cones, each with a different spectral sensitivity signature, there are three standard function specified by the CIE. Accordingly, most color imaging devices are set up with three channels and the spectral sensitivities in these imaging devices are initially designed to attempt to mimic the human visual system.

The spectral sensitivity functions for the color imaging channels in the device should satisfy the Luther condition, that is the channel spectral sensitivities need not be exact duplicates of the CIE color-matching functions described above, but need to be a nonsingular transformation of them. In practice, it is not always possible to manufacture filters for imaging devices that satisfy the Luther condition, often due to the physical limitations of fabricating process. Measurement noise also plays an important role and will degrade the color accuracy even when spectral sensitivity curves fulfill the Luther condition.

Accordingly, it is desirable to have spectral sensitivities which satisfy certain criteria, such as mimicking the human visual system. Unfortunately, it has been difficult to find systems and methods which can accurately and efficiently optimizes spectral sensitivities in an imaging device.

SUMMARY OF THE INVENTION

A method and a computer readable medium having stored thereon programmed instructions for execution by at least one processor for optimizing a selection of spectral sensitivities for an imaging device in accordance with one embodiment includes determining a first set of spectral sensitivities from an initial set of spectral sensitivities based on an analysis of one of a universal measure of goodness, a µ-Factor, and RMS noise. A second set of spectral sensitivities is determined from the first plurality of sets of spectral sensitivities based on an analysis of a different one of the universal measure of goodness, the µ-Factor, and the RMS noise. The second set of spectral sensitivities is an optimized set of spectral sensitivities.

A system for optimizing a selection of spectral sensitivities for an imaging device in accordance with another embodiment an optimizing system that determines a first set of spectral sensitivities based on an analysis of one of a universal measure of goodness, a µ-Factor, and RMS noise. The optimizing system determines a second set of spectral sensitivities from the first plurality of sets of spectral sensitivities based on an analysis of a different one of the universal measure of goodness, the µ-Factor, and the RMS noise, wherein the second set of spectral sensitivities comprises an optimized set of spectral sensitivities.

With the present invention, spectral sensitivity curves for an imaging device can be easily and effectively optimized. As a result, an imaging device with a desired level of image quality can be produced.

DETAILED DESCRIPTION

Figure 1:
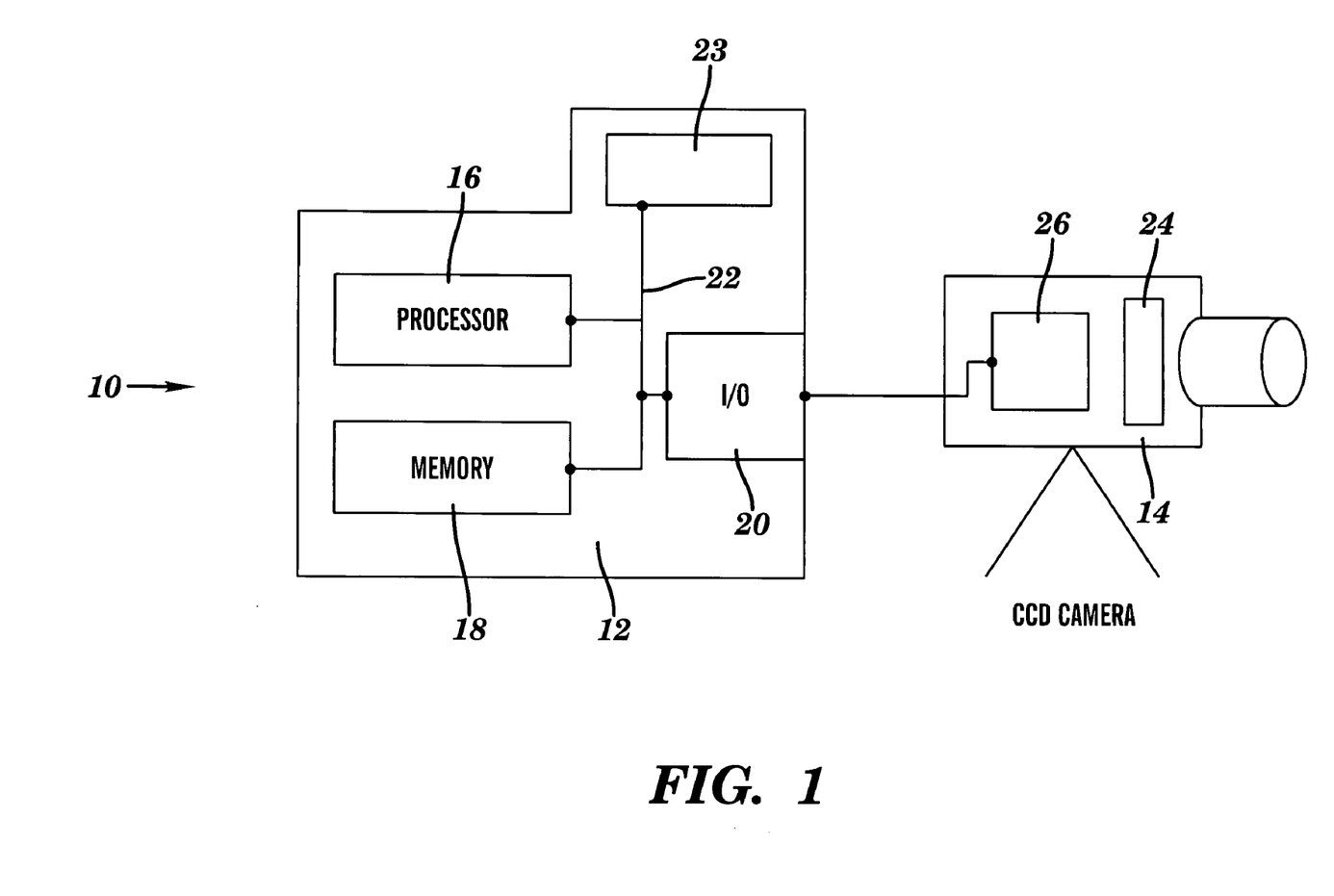
FIG. 1 is a block diagram of a system for optimizing a selection of spectral sensitivities for an imaging device in accordance with an embodiment of the present invention.
Figure 5A:
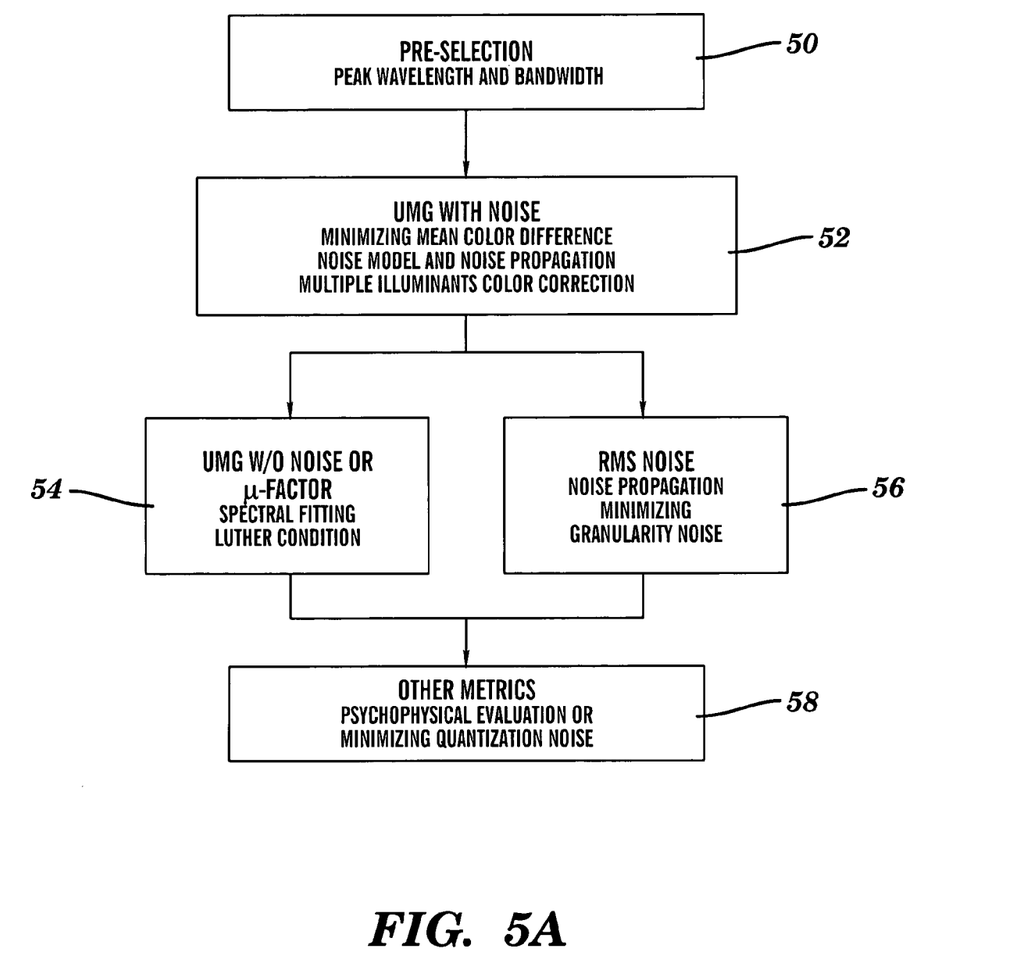
FIG. 5A is a flow chart of a method for optimizing a selection of spectral sensitivities for an imaging device in accordance with an embodiment of the present invention.

A system 10 and method for a selection of spectral sensitivities, also known as spectral sensitivity curves, for an imaging device in accordance with one embodiment of the present invention is illustrated in FIGS. 1 and 5A. The method in accordance with one embodiment includes determining a first set of spectral sensitivities from an initial set of spectral sensitivities based on an analysis of one of a universal measure of goodness, a µ-Factor, and RMS noise. A second set of spectral sensitivities is determined from the first plurality of sets of spectral sensitivities based on an analysis of a different one of the universal measure of goodness, the µ-Factor, and the RMS noise. The second set of spectral sensitivities is an optimized set of spectral sensitivities. Among other features, with the present invention an imaging device with a desired level of image quality can be developed.

Referring to FIG. 1, in this particular embodiment the system 10 includes a spectral sensitivity ("SS") processing system 12 and an optional CCD camera 14, although system 10 may have other types, numbers, and other combinations of components, such as other types of imaging devices. The SS processing system 12 is operatively coupled to the camera 14. A variety of communication systems and/or methods can be used to operatively couple and communicate between the SS processing system 12 and the camera 14, including a direct connection, a local area network, a wide area network, the world wide web, modems and phone lines, or wireless communication technology each having communications protocols. Although one configuration for the system 10 is shown, other configurations are possible and envisioned, such as having SS processing system 12 and camera 14 incorporated in one device.

SS processing system 12 includes at least one processor 16, at least one memory 18, at least one input/output interface 20, and a user input device 23 which are coupled together by a bus system 22 or other link, although the SS processing system 12 may comprise other components, other numbers of the components, and other combinations of the components. The processor 16 executes a program of stored instructions for at least a portion of the method for optimizing a selection of spectral sensitivities for an imaging device in accordance with one embodiment of the present invention as described herein and set forth in FIGS. 5A and 5B. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 16, can be used to store the programmed instructions described herein as well as other information. Although in this particular embodiment, the method in accordance with one embodiment of the invention is stored as programmed instructions in the SS processing system 12 for execution by the processor 16, some or all of the programmed instructions could be stored and executed elsewhere. The input/output interface 20 is used to operatively couple and communicate between the SS processing system 12 and the camera 14. The user input device 23 enables an operator to generate and transmit signals or commands to the processor 16. A variety of different types of user input devices can be used, such as a keyboard or computer mouse.

Figure 2:
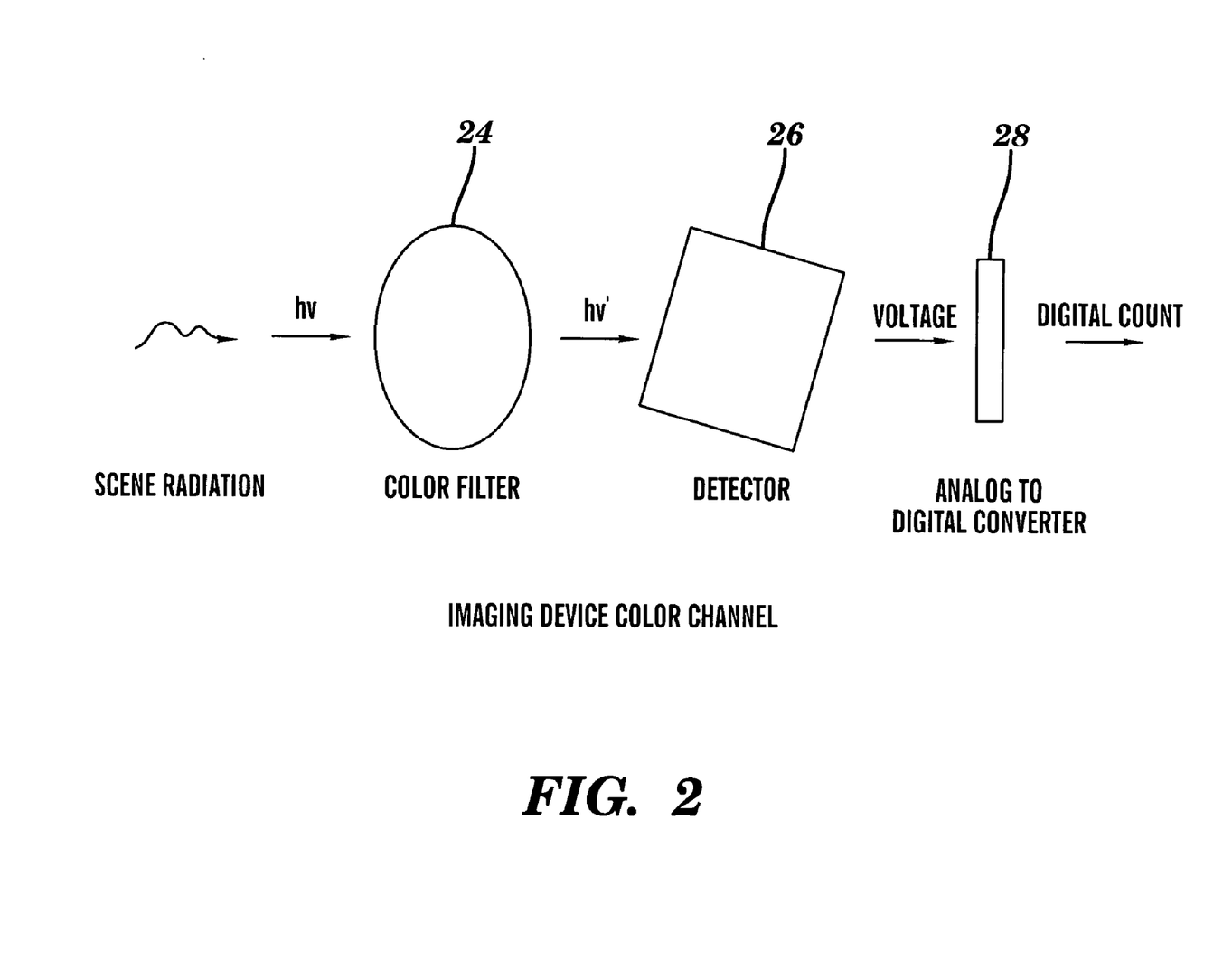
FIG. 2 is a block diagram of a color channel in an imaging device.

Referring to FIG. 2, a block diagram of a color channel in camera 14, although other types of imaging devices can be used, is illustrated. In this particular embodiment, the color channel in the camera 14 includes a filter 24, a detector 26, and an analog-to-digital converter 28, although the color channel in the imaging device can comprise other components and other combinations of components. Each component of an imaging device color channel has a certain response to its expected input. The color filter 24 has a spectral transmission wherein photons at different wavelengths from scene radiation hv have different probabilities of being passed through to the detector 26. These transmission properties can be precisely determined. Likewise, the detector 26 has a spectral sensitivity, wherein for any photon from scene radiation hv' which passes through filter 24 is incident upon the detector 26. Based upon its wavelength, there is a precisely determinable probability that that photon will cause a change in voltage response in the detector 26. The measured voltage in detector 26 is passed to analog-to-digital converter 28 which coverts the analog voltage to a digital value. The spectral sensitivity of the color channel for the camera 14 is derived from the series combination of the filter transmission and the detector spectral sensitivity.

Figure 3:
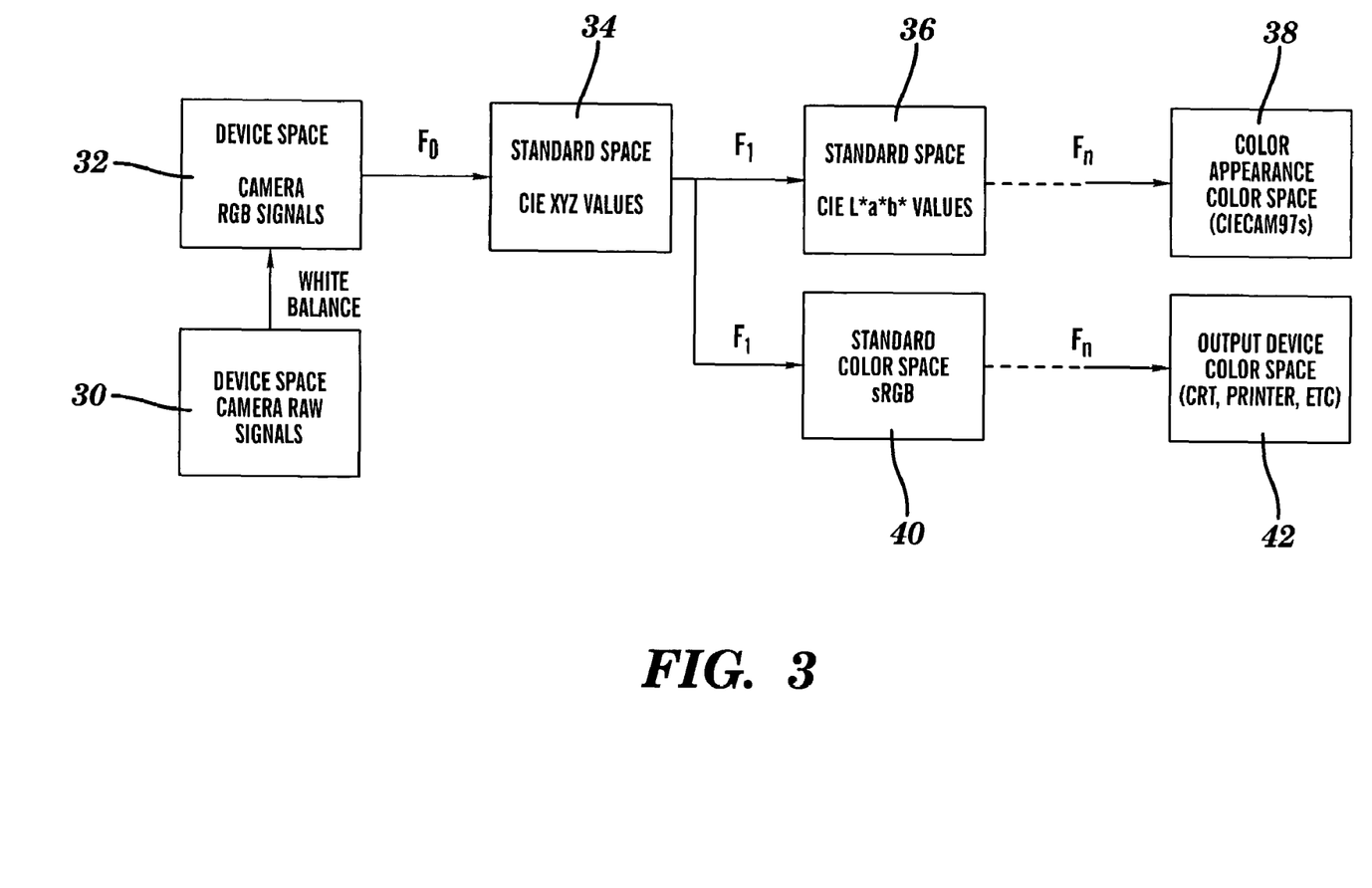
FIG. 3 is a flow chart of a processing pipeline for an imaging.

Referring to FIG. 3, a general processing pipeline for output signals for the camera 14 is illustrated. In this diagram, $F_0$ through $F_n$ represent transformations. In this pipeline, the device space raw signals are obtained in step 30, are transformed to device space camera RBG signals in step 32, and are transformed by a function $F_0$ to standard space CIE XYZ values in step 34. The standard space CIE XYZ values can be transformed by function $F_1$ to standard space CIE L*a*b values in step 36 which are transformed by function(s) $F_n$ to color appearance color space CIECAM97s in step 38. The standard space CIE XYZ values can also be transformed by function $F_1$ to standard color space sRGB values in step 40 which are transformed by function(s) $F_n$ to outdoor device color space (CRT, printer, etc.) in step 42.

The optimal design or selection of spectral sensitivities for the camera 14 and other imaging devices requires consideration of the following properties:

(1) Spectral fit: The CIE color matching functions are approximated by asymmetric Gaussian functions, linear combination of them, or the combinations of real color filter components with a 3×3 matrix. The merit function can be the mean-squared spectra difference $|R-R_1|^2$, or some pre-defined quality factors, such as q-factor and μ-factor. Davies and Wyszecki approximated CIE 1931 standard color matching functions with the sensitivity of photocell and selected filters by separately minimizing the spectral difference between color matching functions and the combined sensitivity functions (photocell plus filter layers). They did not evaluate the three sensitivity functions as a whole system. Instead, q-factor and μ-factor can give good evaluation on how far CIE color matching functions have been approximated with those spectral sensitivity functions.

The quality factor, known as the μ-factor, for evaluating and designing spectral sensitivity functions is disclosed in P. L. Vora and H. J. Trussell, "Measure of goodness of a set of color-scanning filters", J. Opt. Soc. Am. A, Vol.10, No.7, pg. 1499–1503 (1993), which is herein incorporated by reference. The μ-factor is a quality factor which evaluates an arbitrary number of device channel sensitivity functions as an ensemble. More specifically, the μ-factor describes the difference between the orthonormal subspaces of the CIE color matching functions and the spectral sensitivity space. Generally, μ-factor approximately equal to one is an indication of an imaging device expected to deliver high quality color reproduction.

(2) Colorimetric performance of a set of object color spectra: In order to choose a set of spectral sensitivity functions (filters plus photon detector quantum efficiency), a mid-size set of standard object color spectra is input into the camera 14 or other imaging device, both the average color difference and standard deviation are then calculated as criteria for specific spectral sensitivity set. A variety of color difference formula may be used, even in color appearance space, i.e. CIECAM97s which is herein incorporated by reference. Difference color input device may perform differently in terms of color difference scale, so a normalized color difference metric should be used.

(3) Image noise minimization: Another metric, known as a Unified Measure of Goodness ("UMG"), described herein and in U.S. patent application Ser. No. 09/814,634, filed on Mar. 22, 2001 which is herein incorporated by reference in its entirety, is based on minimizing the mean-squared color error in perceptually uniform color space, i.e. CIE L*a*b*, and is essentially different from other quality factors by taking into account both signal-independent and signal-dependent noises and their amplification in target color space when the raw signal is transformed from device-RGB space in step 32 to CIE XYZ space in step 34, to CIE L*a*b* space in step 36. Some "optimal" sets of spectral sensitivity with noise analysis may not be true optimal, and will not work well since noise is amplified too much after those transformations.

(4) Color reproduction accuracy: Maximizing the pre-defined quality factor "UMG" means minimizing and normalizing the average color difference for a set of spectra samples in CIE L*a*b* color space, while the noise in original device/RGB space is propagated into CIE L*a*b* color space.

(5) RMS noise (granularity): square root of the variance of the signal in target color space. When the raw RGB signals are contaminated with noise in step 32, which can be transformed into CIE XYZ space in step 34, then into CIE L*a*b* space in step 36, following the noise propagation rules, the RMS noise of X, Y, and Z, as well as L*, a*, and b* can be calculated. Another paradigm is that the noise in raw device/RGB space is propagated into XYZ color space in step 34, then into sRGB color space in step 40, if sRGB space is the target color space.

The relationship between the UMG quality factor or the average color difference and the RMS noise needs further exploration. The relationship between UMG quality factor and average color difference is already shown as a monotonic one.

The common color-difference metric $\Delta E_{Lab}$ is the Euclidian distance in CIE L*a*b* space. The expected value of $\Delta E_{Lab}$ resulted from noise propagation (RMS noise) can be approximated with the variance-covariance matrix of L*a*b*, which includes the RMS noise axis of L*, a* b* as disclosed by Burns and Berns which is herein incorporated by reference.

The following equation is used by most people as the RMS noise formula:

$$\sigma E^*_{Lab} = \sqrt{\sigma^2_{L^*} + \sigma^2_{a^*} + \sigma^2_{b^*}} \tag{1.1}$$

Since there exists correlation between ΔL, Δa, Δb, and the above equation does not consider this effect, the expectation of random function $$\Delta E^*_{Lab} = \sqrt{\Delta L^{*2} + \Delta a^{*2} + \Delta b^{*2}}$$

can be an alternative to describe the RMS noise:

$$E[\Delta E^*_{Lab}] = \sqrt{\sigma^2_{L^*} + \sigma^2_{a^*} + \sigma^2_{b^*}} - \frac{\sigma^2_p}{8(\sigma^2_{L^*} + \sigma^2_{a^*} + \sigma^2_{b^*})^{3/2}} \tag{1.2}$$

where $\sigma_p^2 = 2(\sigma_{L^*}^4 + \sigma_{a^*}^4 + \sigma_{b^*}^4) - 4(\sigma_{L^*a^*}^2 + \sigma_{L^*b^*}^2 + \sigma_{a^*b^*}^2)$.

Since the covariance (off-diagonal elements) is involved, there is no simple (monotonic) relationship between the color difference metric and the RMS noise. Similar analysis can be carried out in sRGB color space.

Figure 4:
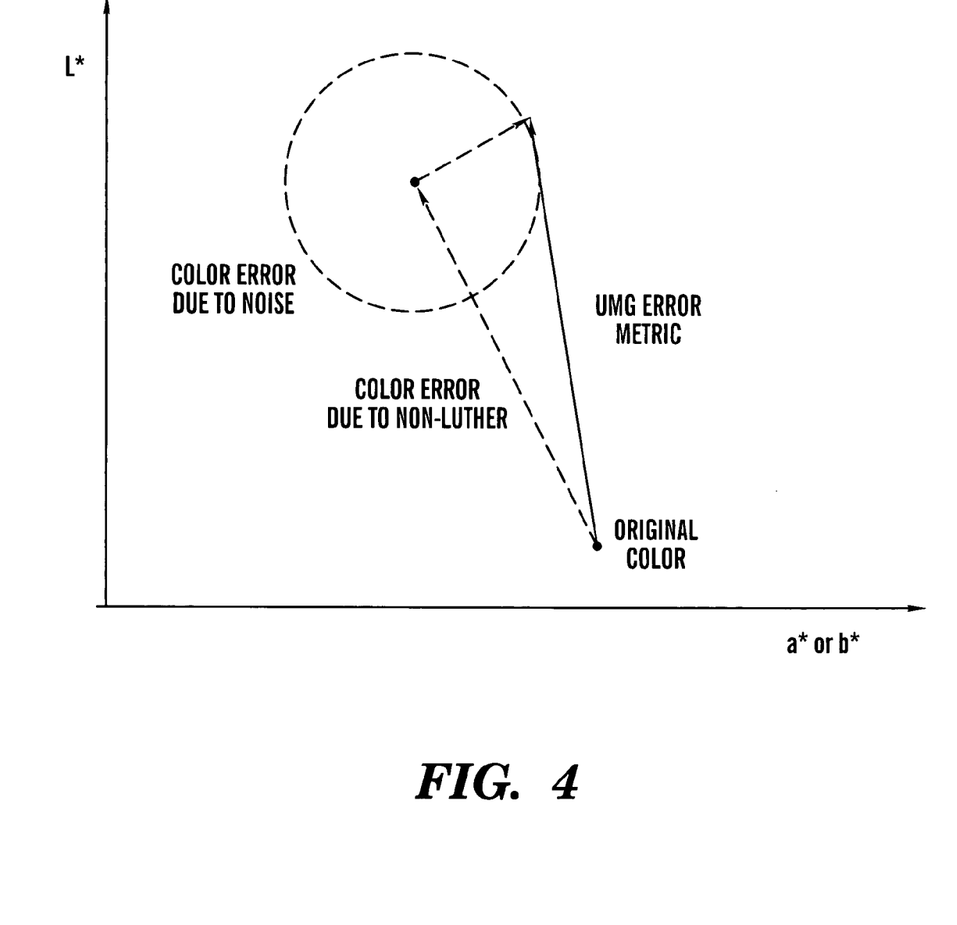
FIG. 4 is a graph of imaging noise sources.

The total color difference includes two aspects which are shown in FIG. 4. One is already defined above, coming from RMS noise, the other comes from the fact that the sensitivity functions do not satisfy the Luther condition, that is, spectral sensitivities are not the linear combinations of color matching functions. The influence of the total color difference can be calculated as the sum of the two portions, or as comprehensive equation as following:

$$\epsilon_0(A_L, G, B) = (E\{\|F(t) - F(\hat{t})\|^2\})^{1/2} = (E\{\|F(t) - F(F_0(t_c + \eta))\|^2\})^{1/2} \tag{1.3}$$

where $\hat{t} = F_0(t_c + \eta)$ is the estimated tristimulus vector from the output of camera. F is the CIE transformation from XYZ to L*a*b*, t is tristimulus vector, $t_c + \eta$ is the camera RGB signal vector which includes noise (currently, shot noise and floor noise are considered). B is a linear matrix, determined through optimization and the expectation operation is taken on the noise term.

There is no clear simple relationship yet between the RMS noise (in either sRGB space or CIE L*a*b* space) and the total color difference (UMG) as shown in FIG. 4. Accordingly, a comprehensive metric for this relationship should be the weighted average of color difference and RMS noise. The amount of weight put on each will vary based on the particular application. For example, if a manufacturer thinks the reduction of RMS noise is more important, more weight should be put on it.

For quantization minimization for a defined encoding scheme, most believe linear uniform quantization is the only choice to digitize signal, in this sense, higher quantization can reach more accurate signal encoding. But if only eight-bit quantization can be used, linear uniform quantization might be replaced with nonlinear quantization or even vector quantization, both of which could be implemented to reduce the signal encoding error (which is inevitable). It is unknown whether non-uniform quantization is used in camera signal encoding. A more complicated quantization method is generally used for data compression.

Error introduced by quantization is often seen as an added signal-independent stochastic source with an approximately uniform probability distribution. Viewing error introduced by signal quantization as a stochastic noise source ignores the fact that all the resulting pixel values are rounded to a finite number of levels. The effective quantization interval is often compared with (visually) detectable intensity or color-differences. For many applications the requirement that each quantization interval is not visible, i.e., not introduce visible artifacts, is more stringent than one based on a comparison of the RMS quantization noise with image fluctuations from other sources, such as scene content and image detection. Quantization error can also be propagated through the signal path in a similar way to that used for stochastic error propagation.

The Unified Measure of Goodness or UMG takes account of the following properties: Minimization of average color difference over an ensemble of standard reflectance samples in uniform color space; the input signal together with noise, which includes shot noise and floor noise is propagated into the target color space; and a linear matrix is obtained by optimization based on the noise propagation property.

A strategy corresponding to multi-illuminant color correction is set forth herein. Assuming the average color difference as Euclidean distance in target color space is minimized:

$$\epsilon = E\{\|F(t) - F(F_0 t_c)\|^2\} \tag{1.4}$$

Where $F_0$ linearly transforms camera output signals from step 32 into CIE XYZ values in step 34, t is the measured CIE XYZ values, $t_c$ is the camera output signal with noise contaminated, and $$F(\square) = F_n(\ldots F_2(F_1(\square))) \tag{1.5}$$

sequentially transform tristimulus values into target color space, i.e. CIE Lab in step 36, or CIECAM97s in step 38 with linear or nonlinear transformations $F_0, \ldots F_n$. While in the first place, $F_0$ is assumed to be a linear matrix in deriving our metric, while in reality, a lot of techniques can be implemented to do this transformation, including polynomial transformation, look-up table etc. If $F_1 \ldots F_n$ are approximately differentiable with continuous first partial derivatives, a first-order Taylor series provides a fairly accurate locally linear approximation for each of them:

$$F_i(x+\Delta x)-F_i(x)=J_{F_i}(x)\Delta x \tag{1.6}$$

With the law of chains for first derivatives, $$F(x+\Delta x)-F(x) = \prod_{i=1}^{n} J_{F_i}(F_i(\cdots F_1(x)))\Delta x = J_F(x)\Delta x \tag{1.7}$$

Therefore, $$\epsilon = E\{\|J_1(t)(t-F_0 t_c)\|^2\} \tag{1.8}$$

By minimizing this color error, the optimal linear matrix $F_0$ can be determined, and a new measure for single viewing-taking illuminant pair can be defined:

$$\epsilon_{min}=\alpha(A_L)-\tau(A_L,G) \tag{1.9}$$

and $$q(A_L, G, F) = \frac{\tau(A_L, G)}{\alpha(A_L)} \tag{1.10}$$

$$\theta = 1 - \sqrt{1 - q(A_L, G, F)} \tag{1.11}$$

Since the taking (recording) and viewing illuminant may be different, a quality factor for any taking and viewing illuminant pair is defined. For a particular application, if there are a set of illuminants $\{L_{v_1}, L_{v_1}, \ldots, L_{v_n}\}$ to be chosen as the viewing illuminant, and another set of illuminants $\{L_{t_1}, L_{t_1}, \ldots, L_{t_n}\}$ to be chosen as the taking illuminant, a quality factor matrix M can be defined as follows:

$$M = \begin{bmatrix} \theta_{11} & \theta_{12} & \theta_{13} & \cdots & \theta_{1m} \\ \theta_{21} & \theta_{22} & \theta_{23} & \cdots & \vdots \\ \theta_{11} & \theta_{11} & \theta_{11} & \cdots & \vdots \\ \vdots & \vdots & \vdots & \ddots & \vdots \\ \theta_{n1} & \theta_{n2} & \theta_{n3} & \cdots & \theta_{nm} \end{bmatrix} \tag{1.12}$$

The comprehensive quality factor UMG for the taking-viewing-illuminant pair may be defined as the weighted average of elements of the above matrix:

$$\Theta = \frac{1}{nm}\sum_{i=1}^{n}\sum_{j=1}^{m} w_{ij}\theta_{ij} \tag{1.13}$$

where $w_y$ is the weight preset by camera manufacturers for the corresponding quality factor $\theta_y$ defined for viewing-taking-illuminant pair $(L_{v_i}, L_{t_j})$, and $$\sum_{i=1}^{n}\sum_{j=1}^{m} w_{ij} = 1.$$

Based on the above analysis, the present invention provides a hierarchical approach to optimizing a selection of spectral sensitivities for a camera 14 or any other imaging device. In this particular embodiment, the imaging properties to be considered are as follows:

1. UMG: color difference and noise propagation;
2. µ-Factor: spectral fitting;
3. RMS noise: granularity noise minimization; and
4. Other indices, such as quantization error minimization Although other imaging properties and combinations can be used.

Since these merit functions describe different aspects of the optimal sensitivity set, they are incorporated into a single metric. Currently, UMG considers the image noise minimization as well as the colorimetric performance of a set of object color spectra. Quantization error is not considered, since the quantization will be carried out with fourteen-bit, which is considered roughly "continuous". Preliminary experimental results show that a comprehensive evaluation with other sample-dependent and sample independent metrics is necessary to obtain optimal set. Again if an ultimate metric is going to be introduced, different weights should be used instead of equal weight and the weights should be determined through objective and subjective methods based on the particular application. It is feasible to optimize those parameters simultaneously, but it may take too much time. Experimental results show that some of the merit functions are really time-consuming and unnecessary, such as UMG.

Figure 5B:
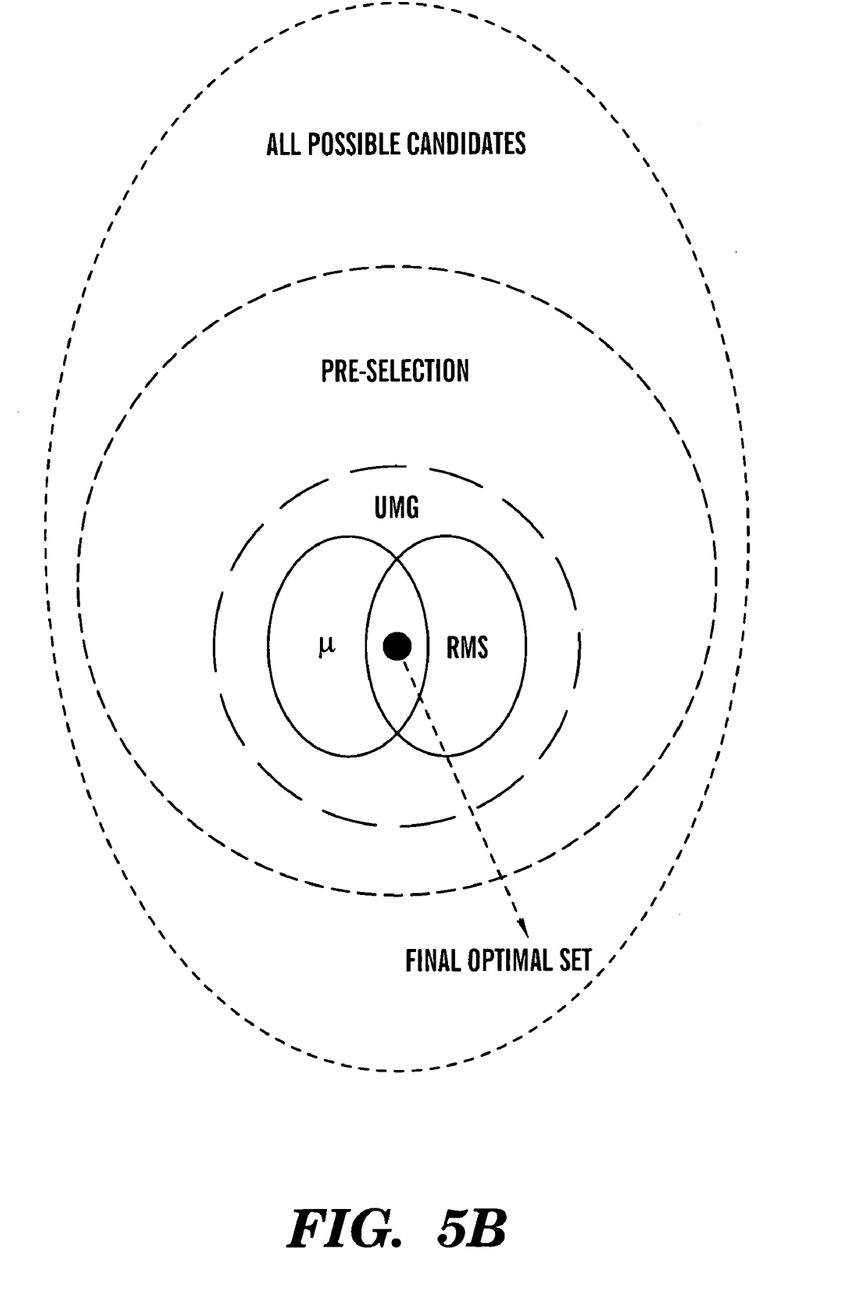
FIG. 5B is a pictorial diagram of the method for optimizing one or more spectral sensitivity curves for an imaging device in accordance with an embodiment of the present invention.
Figure 5C:
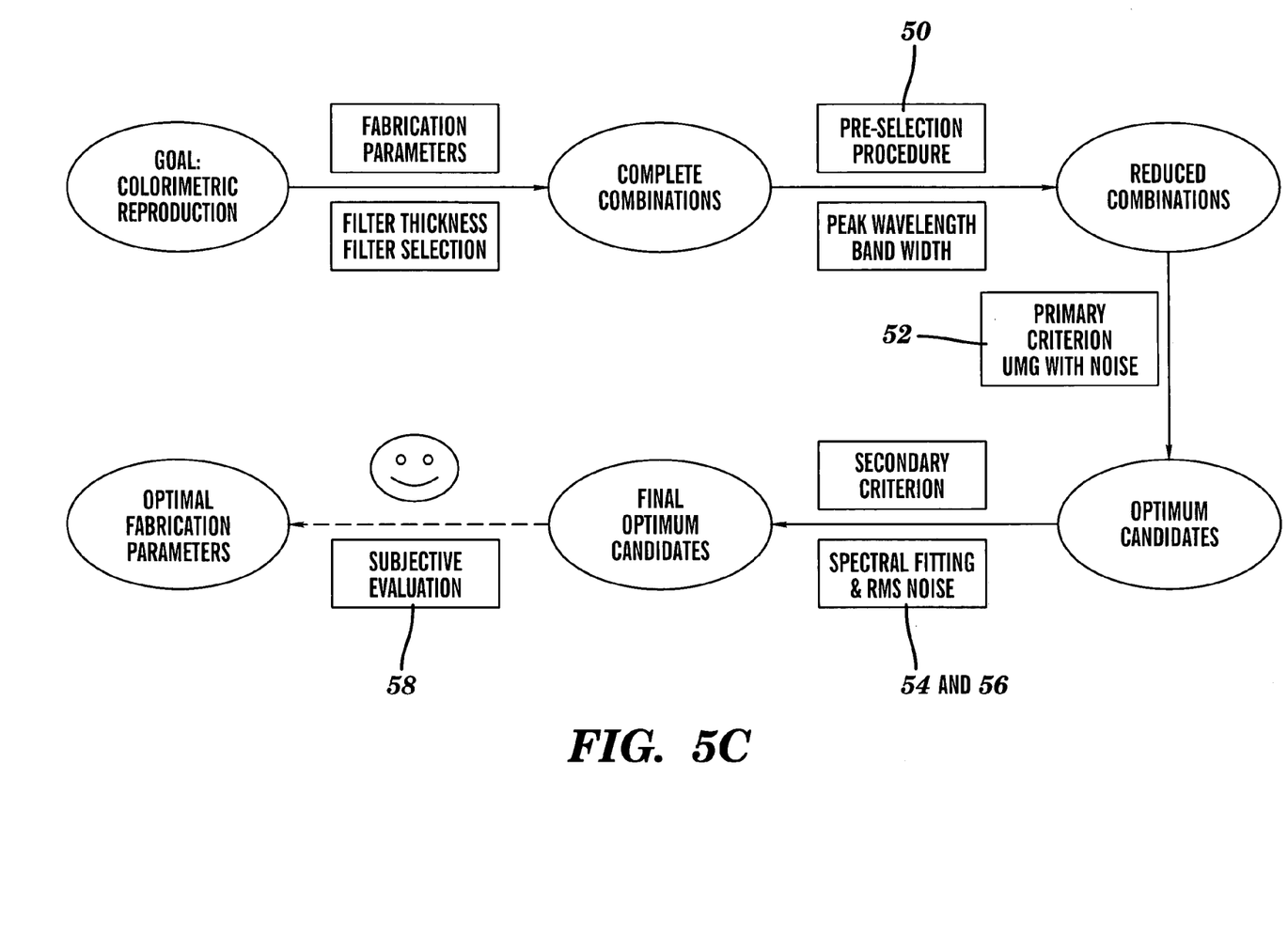
FIG. 5C is a diagram of a hierarchial approach for selecting an optimal spectral sensitivity set in accordance with an embodiment of the present invention.

In this particular embodiment, a series of successive optimizations in accordance with the present invention is shown in FIGS. 5A–5C. By choosing one or two important properties, a collection of optimal sets can be obtained, other parameters will be determined by comparison among this collection of optimal sets.

It is difficult to optimize all those indices at the same time. It is even more difficult to assign numerically different weights for those metrics when a comprehensive objective function is necessary, which should be determined through image quality evaluation procedure. A feasible approach is to optimize the most important index in the first place, which considers more practical conditions than others, and obtain a collection of optimal results. By comparing the other indices among the collection according to their degree of importance, the final desired optimal sets are obtained.

Referring more specifically to FIGS. 5A–5C, a flow chart and diagrams of a method for optimizing one or more spectral sensitivity curves for an imaging device in accordance with an embodiment of the present invention is illustrated.

In step 50, a complete combination of possible filter sets or spectral sensitivities are generated by changing the fabrication parameters of given basic filter components, such as the filter thickness and the filter selection and by assuming that the most desirable shapes are like Gaussian functions. Combinations which have estimated widths and peak positions located in the optimal range based on these parameters and shapes are preselected.

Spectral sensitivity of a camera 14 or other color imaging device is defined as the product of the spectral sensitivity of the imaging detector and the transmittance of the filter. A useful simplified model assumes the spectral sensitivity to be a smooth single-peaked curve in visible range with nonnegative values, although real channel spectral sensitivities may be more complex. In this particular embodiment, the selected spectral sensitivity curves are retrieved from memory 18 from a prior measurement of an imaging device, although the spectral sensitivity curves can be obtained in a variety of other manners.

By way of example only, the selected spectral sensitivity curves can be generated hypothetically by SS processing system 12. More specifically, the spectral sensitivities for the simplified model can be simulated by a combination of smooth cubic spline functions. The cubic spline function for instance with peak position at $\lambda=\lambda_0$ is written as:

$$c(\lambda) = \begin{cases} \dfrac{w^3 + 3w^2(w - |\lambda - \lambda_0|) + 3w(w - |\lambda - \lambda_0|)^2 - 3(w - |\lambda - \lambda_0|)^3}{6w^3} & |\lambda - \lambda_0| \leq w \\ \dfrac{(2w - |\lambda - \lambda_0|)^3}{6w^3} & w \leq |\lambda - \lambda_0| \leq 2w \\ 0 & |\lambda - \lambda_0| \geq 2w \end{cases}$$

where 2w is the width of the cubic spline function at one-fourth peak height (the corresponding width at half peak height is approximately $\sqrt{2}w$).

If a more complicated potential spectral sensitivity curve is desired, one which may be non-symmetrical about its peak wavelength, then consider $w_1$ and $w_2$ which represent the left half and right half widths, respectively. Now the cubic spline function becomes:

$$c(\lambda) = \begin{cases} \dfrac{w^3 + 3w^2(w - |\lambda - P_\lambda|) + 3w(w - |\lambda - P_\lambda|)^2 - 3(w - |\lambda - P_\lambda|)^3}{6w^3} & 0 \leq \lambda - P_\lambda \leq w_2 \\ \dfrac{w^3 + 3w^2(w - |\lambda - P_\lambda|) + 3w(w - |\lambda - P_\lambda|)^2 - 3(w - |\lambda - P_\lambda|)^3}{6w^3} & -w_1 \leq \lambda - P_\lambda \leq 0 \\ \dfrac{(2w - |\lambda - P_\lambda|)^3}{6w^3} w_2 \leq \lambda - P_\lambda \leq 2w_2 \\ \dfrac{(2w - |\lambda - P_2|)^3}{6w^3} - 2w_i \leq \lambda - P_\lambda \leq -w_1 \\ 0 & \text{otherwise} \end{cases}$$

For convenience, $\Delta w$ which is related to $w_1$ and $w_2$ is introduced in the following ways:

$$w_2 - w_1 = 2\Delta w$$

so $$w_1 = w - \Delta w, w_2 = w + \Delta w.$$

and $$\Delta w = \frac{w_2 - w_1}{2}$$

In step 52 the selected set of spectral sensitivity curves are analyzed based on a universal measure of goodness to determine a first subset of spectral sensitivity curves as shown in FIG. 5B. In this particular embodiment, the analysis based on the universal measure of goodness includes an analysis of color difference and noise propagation as described herein.

In step 54 the first subset of spectral sensitivity curves are analyzed based on a µ-Factor to determine a second subset of spectral sensitivity curves as shown in FIG. 5B. In this particular embodiment, the analysis based on the a µ-Factor includes an analysis of spectral fitting as described herein.

In step 56 the selected set of spectral sensitivity curves are also analyzed based on RMS noise to determine a third subset of spectral sensitivity curves as shown in FIG. 5B. In this particular embodiment, the analysis based on the RMS noise includes an analysis of granularity noise minimization as described herein.

As shown in FIG. 5B, the overlap of the second subset of spectral curves and the third subset of spectral curves in the first subset of spectral sensitivity curves identifies a region with the final optimal set of spectral sensitivity curves. Evaluating the combinations or collections of spectral sensitivities with a spectral fitting metric, such as the µ-Factor, in step 54 and simultaneously evaluating the RMS noise properties in step 56 produces an optimal set or sets of spectral sensitivities, although the timing and order of these and other metric analyses can vary. If there are multiple sets of spectral sensitivities after these steps, then they may be further analyzed, such as with a subjective analysis to select the set of spectral sensitivities with the highest comprehensive metric value or, for example,e with other metrics as discussed below in step 58.

In step 58, the optimal set or sets of spectral sensitivity curves can be further analyzed based on other metrics, such as based on minimizing quantization noise to determine a refined final optimal set of spectral sensitivity. Although one order for the steps is shown, the steps can be carried out in other orders. As discussed earlier, a feasible approach is to optimize the most important index or metric in the first place, such as the universal measure goodness in this particular embodiment, and then the other metrics in their order of importance for the particular application.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing one or more spectral sensitivities for an imaging device, the method comprising:
    determining a first set of spectral sensitivities from an initial set of spectral sensitivities based on an analysis of one of a universal measure of goodness, a μ-Factor, and RMS noise; and
    determining a second set of spectral sensitivities from the first set of spectral sensitivities based on an analysis of one of the remaining ones of the universal measure of goodness, the μ-Factor, and the RMS noise which were not used in the determining the first set, wherein the second set of spectral sensitivities comprises an optimized set of spectral sensitivities.

2. The method as set forth in claim 1 further comprising determining a third set of spectral sensitivities from the second set of spectral sensitivities based on an analysis the remaining one of the universal measure of goodness, the μ-Factor, and the RMS noise, wherein the third set of spectral sensitivities comprises the optimized set of spectral sensitivities.

3. The method as set forth in claim 2 further comprising determining a fourth set of spectral sensitivities from the third set of spectral sensitivities based on an analysis of quantization error minimization, wherein the fourth set of spectral sensitivities comprises the optimized set of spectral sensitivities.

4. The method as set forth in claim 2 further comprising applying a different weight to the analysis of the universal measure of goodness, the analysis of the μ-Factor, and the analysis of the RMS noise.

5. The method as set forth in claim 1 wherein the analysis based on the RMS noise further comprises an analysis of granularity noise.

6. The method as set forth in claim 1 further comprising determining a third set of spectral sensitivities from the second set of spectral sensitivities based on an analysis the remaining one of the universal measure of goodness, the μ-Factor, and the RMS noise, wherein an overlap of the second and third sets of spectral sensitivities comprises the optimized set of spectral sensitivities.

7. The method as set forth in claim 6 further comprising determining a fourth set of spectral sensitivities from the second and third sets of spectral sensitivities based on an analysis of quantization error minimization, wherein the fourth set of spectral sensitivities comprises the optimized set of spectral sensitivities.

8. The method as set forth in claim 1 further comprising applying a different weight to the analysis of the one of a universal measure of goodness, a μ-Factor, and RMS noise from the different one of the universal measure of goodness, the μ-Factor, and the RMS noise.

9. The method as set forth in claim 1 wherein one of the determining the first set and the determining the second set is based on an analysis of the universal of goodness.

10. A method for optimizing one or more spectral sensitivities for an imaging device, the method comprising:
    obtaining an initial set of spectral sensitivities;
    determining a first set of spectral sensitivities from the initial set of spectral sensitivities based on an analysis of one of a universal measure of goodness, a μ-Factor, and RMS noise; and
    determining a second set of spectral sensitivities from the first set of spectral sensitivities based on an analysis of a different one of the universal measure of goodness, the μ-Factor, and the RMS noise, wherein the second set of spectral sensitivities comprises an optimized set of spectral sensitivities, wherein the determining a first set of spectral sensitivities further comprises determining the first set of spectral sensitivities from the initial set of spectral sensitivities based on the analysis of color difference and noise propagation.

11. A method for optimizing one or more spectral sensitivities for an imaging device, the method comprising:
    determining a first set of spectral sensitivities from an initial set of spectral sensitivities based on an analysis of one of a universal measure of goodness, a μ-Factor, and RMS noise; and
    determining a second set of spectral sensitivities from the first set of spectral sensitivities based on an analysis of a different one of the universal measure of goodness, the μ-Factor, and the RMS noise, wherein the second set of spectral sensitivities comprises an optimized set of spectral sensitivities and wherein the analysis based on the universal measure of goodness further comprises an analysis of color difference and noise propagation.

12. A method for optimizing one or more spectral sensitivities for an imaging device, the method comprising:
    determining a first set of spectral sensitivities from an initial set of spectral sensitivities based on an analysis of one of a universal measure of goodness, a μ-Factor, and RMS noise; and
    determining a second set of spectral sensitivities from the first set of spectral sensitivities based on an analysis of a different one of the universal measure of goodness, the μ-Factor, and the RMS noise, wherein the second set of spectral sensitivities comprises an optimized set of spectral sensitivities and the analysis based on the μ-Factor further comprises an analysis of spectral fitting.

13. A system for optimizing the selection of camera spectral sensitivities, the system comprising:
    a source for an initial set of spectral sensitivities; and
    an optimizing system that determines a first set of spectral sensitivities from the initial set of spectral sensitivities based on an analysis of one of a universal measure of goodness, a µ-Factor, and RMS noise;

the optimizing system determines a second set of spectral sensitivities from the first set of spectral sensitivities based on an analysis of one of the remaining ones of the universal measure of goodness, the µ-Factor, and the RMS noise which were not used to determine the first set, wherein the second set of spectral sensitivities comprises an optimized set of spectral sensitivities.

14. The system as set forth in claim 13 wherein the optimizing system determines a third set of spectral sensitivities from the second set of spectral sensitivities based on an analysis the remaining one of the universal measure of goodness, the µ-Factor, and the RMS noise, wherein the third set of spectral sensitivities comprises the optimized set of spectral sensitivities.

15. The system as set forth in claim 14 wherein the optimizing system determines a fourth set of spectral sensitivities from the third set of spectral sensitivities based on an analysis of quantization error minimization, wherein the fourth set of spectral sensitivities comprises the optimized set of spectral sensitivities.

16. The system as set forth in claim 14 further comprising a weighting system that applies a different weight to the analysis of the universal measure of goodness, the analysis of the µ-Factor, and the analysis of the RMS noise.

17. The system as set forth in claim 13 wherein the source is at least one of an imaging device and a memory device.

18. The system as set forth in claim 13 wherein the analysis by the optimizing system based on the RMS noise further comprises an analysis of granularity noise.

19. The system as set forth in claim 13 wherein the optimizing system determines a third set of spectral sensitivities from the second set of spectral sensitivities based on an analysis the remaining one of the universal measure of goodness, the µ-Factor, and the RMS noise, wherein an overlap of the second and third sets of spectral sensitivities comprises the optimized set of spectral sensitivities.

20. The system as set forth in claim 19 wherein the optimizing system determines a fourth set of spectral sensitivities from the second and third sets of spectral sensitivities based on an analysis of quantization error minimization, wherein the fourth set of spectral sensitivities comprises the optimized set of spectral sensitivities.

21. The system as set forth in claim 13 further comprising a weighting system that applies a different weight to the analysis of the one of a universal measure of goodness, a µ-Factor, and RMS noise from the different one of the universal measure of goodness, the µ-Factor, and the RMS noise.

22. The system as set forth in claim 13 wherein the optimizing system determines one of the first set and the second set based on an analysis of the universal of goodness.

23. A system for optimizing the selection of camera spectral sensitivities, the system comprising:

a source for an initial set of spectral sensitivities; and an optimizing system that determines a first set of spectral sensitivities from the initial set of spectral sensitivities based on an analysis of one of a universal measure of goodness, a µ-Factor, and RMS noise;

the optimizing system determines a second set of spectral sensitivities from the first set of spectral sensitivities based on an analysis of a different one of the universal measure of goodness, the µ-Factor, and the RMS noise, wherein the second set of spectral sensitivities comprises an optimized set of spectral sensitivities, wherein the analysis by the optimizing system based on the universal measure of goodness further comprises an analysis of color difference and noise propagation.

24. A system for optimizing the selection of camera spectral sensitivities, the system comprising:

a source for an initial set of spectral sensitivities; and an optimizing system that determines a first set of spectral sensitivities from the initial set of spectral sensitivities based on an analysis of one of a universal measure of goodness, a µ-Factor, and RMS noise;

the optimizing system determines a second set of spectral sensitivities from the first set of spectral sensitivities based on an analysis of a different one of the universal measure of goodness, the µ-Factor, and the RMS noise, wherein the second set of spectral sensitivities comprises an optimized set of spectral sensitivities, wherein the analysis by the optimizing system based on the µ-Factor further comprises an analysis of spectral fitting.

25. A computer-readable medium having stored thereon instructions, which when executed by at least one processor, causes the processor to perform:

determining a first set of spectral sensitivities from an initial set of spectral sensitivities based on an analysis of one of a universal measure of goodness, a µ-Factor, and RMS noise; and determining a second set of spectral sensitivities from the first set of spectral sensitivities based on an analysis of one of the remaining ones of the universal measure of goodness, the µ-Factor, and the RMS noise which were not used in the determining the first set, wherein the second set of spectral sensitivities comprises an optimized set of spectral sensitivities.

26. The medium as set forth in claim 25 further comprising determining a third set of spectral sensitivities from the second set of spectral sensitivities based on an analysis the remaining one of the universal measure of goodness, the µ-Factor, and the RMS noise, wherein the third set of spectral sensitivities comprises the optimized set of spectral sensitivities.

27. The medium as set forth in claim 26 further comprising determining a fourth set of spectral sensitivities from the third set of spectral sensitivities based on an analysis of quantization error minimization, wherein the fourth set of spectral sensitivities comprises the optimized set of spectral sensitivities.

28. The medium as set forth in claim 26 further comprising applying a different weight to the analysis of the universal measure of goodness, the analysis of the µ-Factor, and the analysis of the RMS noise.

29. The medium as set forth in claim 25 wherein the analysis based on the RMS noise further comprises an analysis of granularity noise.

30. The medium as set forth in claim 25 further comprising determining a third set of spectral sensitivities from the second set of spectral sensitivities based on an analysis the remaining one of the universal measure of goodness, the µ-Factor, and the RMS noise, wherein an overlap of the second and third sets of spectral sensitivities comprises the optimized set of spectral sensitivities.

31. The medium as set forth in claim 30 further comprising determining a fourth set of spectral sensitivities from the second and third sets of spectral sensitivities based on an analysis of quantization error minimization, wherein the fourth set of spectral sensitivities comprises the optimized set of spectral sensitivities.

32. The medium as set forth in claim 25 further comprising applying a different weight to the analysis of the one of a universal measure of goodness, a µ-Factor, and RMS noise from the different one of the universal measure of goodness, the µ-Factor, and the RMS noise.

33. The medium as set forth in claim 25 wherein one of the determining the first set and the determining the second set is based on an analysis of the universal of goodness.

34. A computer-readable medium having stored thereon instructions, which when executed by at least one processor, causes the processor to perform:

obtaining an initial set of spectral sensitivities;

determining a first set of spectral sensitivities from the initial set of spectral sensitivities based on an analysis of one of a universal measure of goodness, a µ-Factor, and RMS noise; and determining a second set of spectral sensitivities from the first set of spectral sensitivities based on an analysis of a different one of the universal measure of goodness, the µ-Factor, and the RMS noise, wherein the second set of spectral sensitivities comprises an optimized set of spectral sensitivities, wherein the determining a first set of spectral sensitivities further comprises determining the first set of spectral sensitivities from the initial set of spectral sensitivities based on the analysis of color difference and noise propagation.

35. A computer-readable medium having stored thereon instructions, which when executed by at least one processor, causes the processor to perform:

determining a first set of spectral sensitivities from an initial set of spectral sensitivities based on an analysis of one of a universal measure of goodness, a µ-Factor, and RMS noise; and determining a second set of spectral sensitivities from the first set of spectral sensitivities based on an analysis of a different one of the universal measure of goodness, the µ-Factor, and the RMS noise, wherein the second set of spectral sensitivities comprises an optimized set of spectral sensitivities, wherein the analysis based on the universal measure of goodness further comprises an analysis of color difference and noise propagation.

36. A computer-readable medium having stored thereon instructions, which when executed by at least one processor, causes the processor to perform:

determining a first set of spectral sensitivities from an initial set of spectral sensitivities based on an analysis of one of a universal measure of goodness, a µ-Factor, and RMS noise; and determining a second set of spectral sensitivities from the first set of spectral sensitivities based on an analysis of a different one of the universal measure of goodness, the µ-Factor, and the RMS noise, wherein the second set of spectral sensitivities comprises an optimized set of spectral sensitivities, wherein the analysis based on the µ-Factor further comprises an analysis of spectral fitting.

37. A system for optimizing the selection of camera spectral sensitivities, the system comprising:

an optimizing system that determines a first set of spectral sensitivities from an initial set of spectral sensitivities based on an analysis of one of at least a universal measure of goodness, a µ-Factor, and RMS noise;

the optimizing system determines a second set of spectral sensitivities from the first set of spectral sensitivities based on an analysis of a different one of the universal measure of goodness, the µ-Factor, and the RMS noise, wherein the second set of spectral sensitivities comprises an optimized set of spectral sensitivities and wherein the optimizing system determines one of the first set and the second set based on an analysis of the universal measure of goodness.

* * * * *